United States Patent
Jin et al.

(10) Patent No.: US 12,313,139 B2
(45) Date of Patent: May 27, 2025

(54) SYSTEM AND METHOD FOR MONITORING WEAR OF BRAKING FRICTIONAL PAD OF MOTOR VEHICLE

(71) Applicant: Volvo Car Corporation, Gothenburg (SE)

(72) Inventors: Yongxing Jin, Shanghai (CN); Ming Yuan, Shanghai (CN); Yi Yu, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 471 days.

(21) Appl. No.: 17/746,088

(22) Filed: May 17, 2022

(65) Prior Publication Data

US 2022/0373050 A1    Nov. 24, 2022

(30) Foreign Application Priority Data

May 18, 2021   (CN) .......................... 202110539516.3

(51) Int. Cl.
  *F16D 66/02*   (2006.01)
  *F16D 65/18*   (2006.01)
  (Continued)

(52) U.S. Cl.
  CPC ........... *F16D 66/023* (2013.01); *F16D 65/18* (2013.01); *F16D 2066/003* (2013.01);
  (Continued)

(58) Field of Classification Search
  CPC .. F16D 66/023; F16D 65/18; F16D 2066/003; F16D 66/021; F16D 55/226;
  (Continued)

(56) References Cited

U.S. PATENT DOCUMENTS 9,316,277 B2 *   4/2016   Winkler ................... F16D 65/18
2005/0035653 A1 *   2/2005   Godlewsky .............. B60T 17/22
                                                303/122.03

(Continued)

FOREIGN PATENT DOCUMENTS

EP    1253056 A2    10/2002
JP    2017017251 A    1/2017

OTHER PUBLICATIONS

Japanese Patent No. JP WO2007091337 published on Jul. 2, 2009.*

(Continued)

*Primary Examiner* — Pamela Rodriguez
(74) *Attorney, Agent, or Firm* — Clements Bernard Walker; Christopher L. Bernard

(57) ABSTRACT

A method and a system for monitoring wear of a braking frictional pad of a motor vehicle, the motor vehicle including a brake device acting on a vehicle wheel, the brake device including a braking frictional pad that is non-rotatable relative to the vehicle wheel and is linearly movable parallel to a rotational axis of the vehicle wheel; a brake piston configured to drive the braking frictional pad; and an electric parking brake or an electric mechanical brake, the electric parking brake or the electric mechanical brake having a drive motor and a piston driving part driven by the drive motor to be linearly movable, the piston driving part being configured to, when the motor vehicle is braking, drive the brake piston to contact the braking frictional pad and in turn drive the braking frictional pad to move.

18 Claims, 7 Drawing Sheets

(51) Int. Cl.
   *F16D 66/00* (2006.01)
   *F16D 121/24* (2012.01)
   *F16D 125/06* (2012.01)
   *F16D 125/40* (2012.01)

(52) U.S. Cl.
   CPC ...... *F16D 2121/24* (2013.01); *F16D 2125/06* (2013.01); *F16D 2125/40* (2013.01)

(58) Field of Classification Search
   CPC ............ F16D 2121/24; F16D 2125/40; F16D 66/6518; B60T 17/22; B60T 13/588; B60T 13/741
   See application file for complete search history.

(56) References Cited

U.S. PATENT DOCUMENTS

2018/0031065 A1   2/2018   Shabbir et al.
2020/0072308 A1*  3/2020   Kocjan ................. B60T 13/741

OTHER PUBLICATIONS

Chinese Patent No. CN 111204321 to Ding published on Sep. 1, 2023.*
Oct. 12, 2022 European Search Report issued in corresponding EP Application EP22173954.

* cited by examiner

SYSTEM AND METHOD FOR MONITORING WEAR OF BRAKING FRICTIONAL PAD OF MOTOR VEHICLE

CROSS-REFERENCE TO RELATED APPLICATION

The present disclosure claims the benefit of priority of co-pending Chinese Patent Application No. 202110539516.3, filed on May 18, 2021, and entitled "SYSTEM AND METHOD FOR MONITORING WEAR OF BRAKING FRICTIONAL PAD OF MOTOR VEHICLE", the contents of which are incorporated in full by reference herein.

TECHNICAL FIELD

The present disclosure generally relates to a system and a method for monitoring wear of a braking frictional pad of a motor vehicle.

BACKGROUND

Brake devices are mandatory for motor vehicles under traffic laws and regulations. A brake device generally includes a brake disc installed such that it can be rotated together with a vehicle wheel's wheel rim and a braking frictional pad installed non-rotatably relative to the vehicle rim. For example, each brake disc can be equipped with two braking frictional pads which are installed on opposing sides of the respective brake disc with gaps therebetween respectively. The two braking frictional pads can be moved by a drive mechanism to contact the rotating brake disc, to clamp the brake disc. In this way, the brake disc can be stopped due to friction braking.

Usually, the brake disc is harder than the braking frictional pads. Therefore, the braking frictional pad can be worn and thus have a thinned thickness due to long-term braking. In order to generate sufficient friction braking, it is required to replace the old braking frictional pad, after its thickness is less than a given value, with a new one in time. Therefore, it is necessary to monitor the braking frictional pad's wear state.

A conventional method for monitoring the wear of a braking frictional pad includes providing a metal sheet on a backing plate of the braking frictional pad. This metal sheet is configured to have a free end adjacent to a wear surface (i.e., a surface contacting the brake disc) of the braking frictional pad. Moreover, the free end is spaced from the wear surface by a given distance along a thickness direction of the brake disc. Normally, the free end of the metal plate is not in contact with the brake disc when the braking frictional pad contacts the brake disc to generate friction braking. However, after the braking frictional pad is thinned to a given extent, the free end of the metal plate will be in contact with the rotating brake disc and thus a harsh sound will be generated during the friction braking. Therefore, a driver is alerted that the braking frictional pad shall be replaced with a new one. This conventional method for monitoring the wear state of the braking frictional pad is disadvantageous in that the driver cannot know the wear state of the braking frictional pad before the harsh sound be generated. Furthermore, contact of the metal sheet with the rotating brake disc can also damage the brake disc.

Another conventional method for monitoring the wear state of a braking frictional pad includes providing the braking frictional pad with a resistance sensor. For instance, the resistance sensor is configured to be embedded directly in a frictional material of the braking frictional pad or inserted into a backing plate of the braking frictional pad such that the sensor is distributed along a thickness direction of the frictional material. When the braking frictional pad is worn and thus thinned to a given extent, a resistance value of the resistance sensor can change during braking. Therefore, an early warning could be achieved by monitoring the change of the resistance value. However, this method for monitoring the wear state of the braking frictional pad is disadvantageous in that the resistance sensor has to be equipped with a specific cable to read an electrical signal from the sensor. However, the existence of such a specific cable increases the complexity of suspension structure design and assembling. Furthermore, such a resistance sensor cannot enable the wear state of the braking frictional pad to be continuously monitored. Moreover, the resistance sensor and its specific cable can result in higher component costs and higher design and assembling costs.

SUMMARY

In order to solve the aforementioned issues in the prior art, the present disclosure proposes a novel system and method for monitoring wear of a braking frictional pad such that vehicle design and assembling costs will not be significantly increased and the wear state of the braking frictional pad can be continuously monitored.

According to an aspect, the present disclosure proposes a method for monitoring a thickness loss of a braking frictional pad of a motor vehicle, the motor vehicle comprising: vehicle wheels; a brake device acting on a vehicle wheel, the brake device including a braking frictional pad that is non-rotatable relative to the vehicle wheel and is linearly movable parallel to a rotational axis of the vehicle wheel; a brake piston configured to drive the braking frictional pad; and an electric parking brake or an electric mechanical brake, the electric parking brake or the electric mechanical brake having a drive motor and a piston driving part driven by the drive motor to be linearly movable, the piston driving part configured to drive the brake piston to contact the braking frictional pad and in turn drive the braking frictional pad to move when the motor vehicle is braking; the method comprising:
  operating, after the motor vehicle has been parked, the drive motor to move the piston driving part to a preset reference position;
  continuing to operate the drive motor to move the piston driving part from the reference position to a stop position where it contacts the brake piston, wherein the stop position is associated with a parking braking position of the brake piston;
  determining a distance between the reference position and the stop position; and
  calculating a difference between the determined distance and a predetermined reference distance to determine the thickness loss of the monitored braking frictional pad.

In an embodiment, the reference distance is a travel distance of the piston driving part moving from the reference position to the stop position, said travel distance is determined when the monitored braking frictional pad has a known thickness or the monitored braking frictional pad is a brand new one, and when the motor vehicle is in parking braking.

In an embodiment, the thickness loss of the monitored braking frictional pad is absolute value of the difference between the determined distance and the reference distance.

In an embodiment, the method further comprises alerting a driver of the motor vehicle to replace the braking frictional pad with a new one when the thickness loss exceeds a threshold. In an embodiment, when the thickness loss is greater than a threshold, a driver of the motor vehicle is alerted to replace the braking frictional pad with a new one. In an embodiment, the method further comprises alerting a driver of the motor vehicle to replace the braking frictional pad with a new one when the thickness loss exceeds a threshold, a driver of the motor vehicle is alerted to replace the braking frictional pad with a new one.

In an embodiment, the electric parking brake or the electric mechanical brake further comprises a reducer mechanism connected to an output shaft of the drive motor, and a linear movement mechanism driven by the reducer mechanism; said reducer mechanism is configured to provide a lock function in braking to prevent the piston driving part from moving freely, and said linear movement mechanism is configured to drive the piston driving part to linearly move.

In an embodiment, the vehicle wheel is a front or rear vehicle wheel of the motor vehicle.

In an embodiment, the linear movement mechanism is a thread-screw mechanism that includes a core shaft connected to the output shaft of the drive motor, said core shaft comprising external threads on its outer surface, and said piston driving part is a threaded part having internal threads that engage the external threads of the core shaft and is configured to be non-rotatable relative to the core shaft, and be axially movable back and forth along the core shaft.

In an embodiment, the distance between the reference position and the stop position is at least dependent on a rotation speed of the output shaft of the drive motor, a transmission ratio of the reducer mechanism, a pitch of thread of the thread-screw mechanism, and a time duration during which the drive motor is turned on.

In an embodiment, each vehicle wheel of the motor vehicle is equipped with the brake device and a hydraulic brake, the hydraulic brake drive comprising a cylinder body installed fixedly to the motor vehicle's body and a brake piston configured to be linearly movable in the cylinder body to drive the braking frictional pad of the brake device to move; wherein the brake piston of the respective hydraulic brake drive is the piston driving part driven by the electric parking brake or the electric mechanical brake. In an embodiment, each vehicle wheel of the motor vehicle is equipped with the brake device, and the motor vehicle also comprises a hydraulic brake drive equipped for each vehicle wheel, the hydraulic brake drive has a cylinder body installed fixedly to the motor vehicle's body and a brake piston which is configured to be linearly moved in the cylinder body to drive the braking frictional pad of the brake device to move; and the piston driving part driven by the electric parking brake or the electric mechanical brake is the brake piston of the respective hydraulic brake drive.

In an embodiment, before the thickness loss can be determined, a vehicle wheel that is not equipped with the electric parking brake is braked for parking via the hydraulic brake drive. In an embodiment, when the motor vehicle is equipped with the electric parking brake and before the thickness loss is determined, a vehicle wheel that is not equipped with the electric parking brake is braked for parking by the hydraulic brake drive.

In an embodiment, each vehicle wheel of the motor vehicle is equipped with the electric mechanical brake only.

In an embodiment, the motor vehicle comprising front and rear vehicle wheels, and each vehicle wheel is equipped with the electrical mechanical brake, the method is performed to determine the thickness loss of the braking frictional pads of the rear vehicle wheels through the equipped electric mechanical after parking braking of the front vehicle wheels is accomplished through their electric mechanical brakes or to determine the thickness loss of the braking frictional pads of the front vehicle wheels through their equipped electric mechanical brakes after parking braking of the rear vehicle wheels is accomplished through the electric mechanical brakes. In an embodiment, the method further comprises: 1) first accomplishing parking braking of the front vehicle wheels through their electric mechanical brakes; and then determining the thickness loss of the braking frictional pads of the rear vehicle wheels through their electric mechanical brakes; or 2) first accomplishing parking braking of the rear vehicle wheels by their electric mechanical brakes, and then determining the thickness loss of the braking frictional pads of the front vehicle wheels by their electric mechanical brakes.

In an embodiment, the current thickness of the braking frictional pad is determined by deducting the thickness loss of the monitored braking frictional pad from a thickness of a new braking frictional pad of the same specification as the monitored braking frictional pad or a known thickness of the monitored braking frictional pad prior to performing the foresaid method. In an embodiment, the current thickness of the monitored braking frictional pad is determined as a function of the thickness loss, and is displayed on a dashboard of the motor vehicle and/or transmitted to a mobile electronic device of the driver.

In an embodiment, the current thickness of the braking frictional pad is a thickness of the braking frictional pad known before being monitored or a thickness of a new braking frictional pad of the same specification as the monitored braking frictional pad minus the thickness loss of the monitored braking frictional pad.

In an embodiment, a direction along which the piston driving part moves to the reference position is opposite to a direction along which the piston driving part moves from the reference position to the stop position.

According to another aspect, the present disclosure proposes a system for monitoring a thickness loss of a braking frictional pad of a motor vehicle, the motor vehicle comprising:

vehicle wheels;
a brake device acting on each of the vehicle wheels, the brake device including a braking frictional pad configured to be non-rotatable relative to the vehicle wheel and be linearly movable parallel to a rotational axis of the vehicle wheel; and
a brake piston configured to drive the braking frictional pad;

the system comprising:
an electric parking brake or an electric mechanical brake, the electric parking brake or the electric mechanical brake having a drive motor and a piston driving part driven by the drive motor to be linearly movable, the piston driving part configured to drive the piston to contact the braking frictional pad and in turn drive the braking frictional pad to move when the motor vehicle is braking; and
an electronic control unit electrically connected to the electric parking brake or the electric mechanical brake to control operation of the electric parking brake or the electric mechanical brake, comprising:

a first module configured to, after the motor vehicle has been parked, provide instructions for operating the drive motor to move the piston driving part to a preset reference position;

a second module configured to provide instructions for continuing to operate the drive motor to drive the piston driving part from the reference position to a stop position where it contacts the brake piston, wherein the stop position is associated with a parking braking position of the brake piston;

a third module configured to provide instructions for determining a distance between the reference position and the stop position; and a fourth module configured to provide instructions for a difference between the determined distance and a predetermined reference distance to determine the thickness loss of the monitored braking frictional pad.

In an embodiment, the reference distance is a travel distance of the piston driving part moving from the reference position to the stop position, said travel distance is determined when the monitored braking frictional pad has a known thickness or the monitored braking frictional pad is a brand new one, and when the motor vehicle is in parking braking.

In an embodiment, the thickness loss of the monitored braking frictional pad is absolute value of the difference between the determined distance and the reference distance.

In an embodiment, the electronic control unit further comprises a fifth module configured to provide instructions for alerting a driver of the motor vehicle to replace the braking frictional pad with a new one when the thickness loss exceeds a threshold.

In an embodiment, the electric parking brake or the electric mechanical brake further comprises a reducer mechanism connected to an output shaft of the drive motor, and a linear movement mechanism driven by the reducer mechanism; said reducer mechanism is configured to provide a lock function in braking to prevent the piston driving part from moving freely, and said linear movement mechanism is configured to drive the piston driving part to linearly move.

In an embodiment, the vehicle wheel is a front or rear vehicle wheel of the motor vehicle.

In an embodiment, the linear movement mechanism is a thread-screw mechanism that includes a core shaft connected to the output shaft of the drive motor, said core shaft comprising external threads on its outer surface, and said piston driving part is a threaded part having internal threads that engage the external threads of the core shaft and is configured to be non-rotatable relative to the core shaft, and be axially movable back and forth along the core shaft.

In an embodiment, the distance between the reference position and the stop position is at least dependent on a velocity of rotation of the output shaft of the drive motor, a transmission ratio of the reducer mechanism, a pitch of thread of the thread-screw mechanism, and the duration of the drive motor energized.

In an embodiment, the brake device is equipped for each vehicle wheel of the motor vehicle, and the motor vehicle further includes a hydraulic brake drive equipped for each vehicle wheel, the hydraulic brake drive has a cylinder body secured relative to the motor vehicle's body and a brake piston that is configured to be linearly moved in the cylinder body to drive the braking frictional pad of the brake device to move; the piston driving part driven by the electric parking brake or the electric mechanical brake is the brake piston of the respective hydraulic brake drive.

In an embodiment, when the motor vehicle is equipped with the electric parking brake and before the thickness loss is determined, a vehicle wheel that is not equipped with the electric parking brake is braked for parking by the hydraulic brake drive.

In an embodiment, each vehicle wheel of the motor vehicle is equipped with the electric mechanical brake only.

In an embodiment, the electronic control unit further includes an eighth module configured to provide instructions for: 1) first accomplishing parking braking of the front vehicle wheels through their electric mechanical brakes, and then determining the thickness loss of the braking frictional pads of the rear vehicle wheels through their electric mechanical brakes; or 2) first accomplishing parking braking of the rear vehicle wheels by their electric mechanical brakes, and then determining the thickness loss of the braking frictional pads of the front vehicle wheels by their electric mechanical brakes.

In an embodiment, the electronic control unit further includes a sixth module configured to provide instructions for determining the current thickness of the monitored braking frictional pad as a function of the thickness loss, and displaying the determined current thickness on a dashboard of the motor vehicle and/or transmitting the determined current thickness to a mobile electronic device of the driver.

In an embodiment, the current thickness of the braking frictional pad is a thickness of the braking frictional pad known before being monitored or a thickness of a new braking frictional pad of the same specification as the monitored braking frictional pad minus the thickness loss of the monitored braking frictional pad.

In an embodiment, a direction along which the piston driving part moves to the reference position is opposite to a direction along which the piston driving part moves from the reference position to the stop position.

By using the technical measures as provided in the present disclosure, the wear state of the braking frictional pad can be continuously monitored without adding extra apparatus to the braking frictional pad. Therefore, it provides a reliable indicator to the motor vehicle's user for replacing the braking frictional pad and leads to lower costs of designing, manufacturing and assembling the brake device. Furthermore, the system and method according to the present disclosure can be independently embodied or alternatively embodied as a supplement to the convention method for monitoring the wear of the braking frictional pad using a metal plate or a resistance sensor.

BRIEF DESCRIPTION OF THE DRAWINGS

The principles and other aspects of the present disclosure will be explained in the following description with reference to the drawings, in which.

DETAILED DESCRIPTION OF EMBODIMENTS

Figure 1:
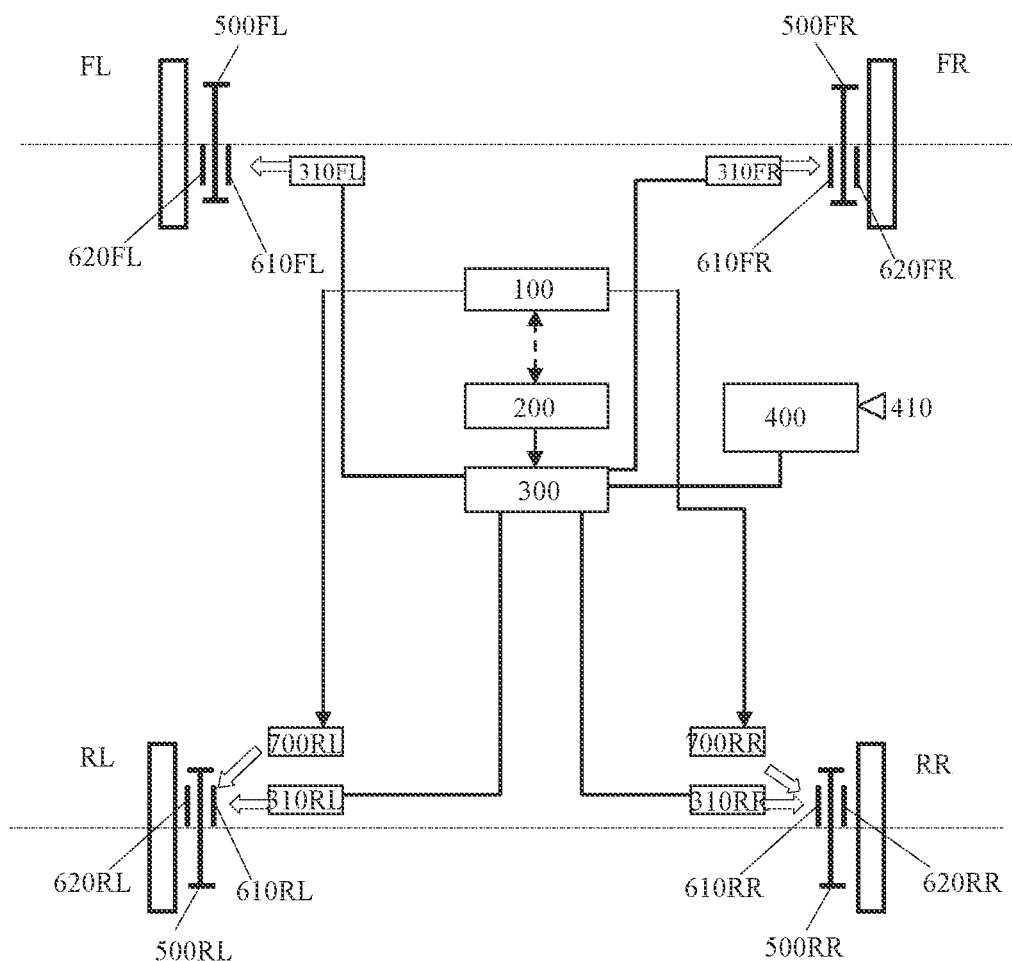
FIG. 1 is a schematic diagram illustrating a vehicle brake system in which a system or method for monitoring wear of a braking frictional pad according to an embodiment of the present disclosure can be implemented, wherein the vehicle brake system includes a hydraulic brake drive configured to act on each vehicle wheel and an electric parking brake configured to act on each rear wheel of a motor vehicle, and the electric parking brake can be operated independently of the hydraulic brake drive.

In the drawings of the present disclosure, the features having the same configuration or same functions are represented by the same reference numerals respectively.

FIG. 1 is a schematic diagram illustrating a vehicle brake system according to an embodiment. The vehicle brake system includes a hydraulic brake drive configured to act on each vehicle wheel of a motor vehicle and an electric parking brake configured to act on only two rear vehicle wheels of the motor vehicle. The electric parking brake is configured to operate independently of the hydraulic brake drive. It should be understood by a person skilled in the art that in an alternative embodiment, the electric parking brake of FIG. 1 can be configured to act on two front vehicle wheels of the motor vehicle. FIG. 1 shows an embodiment of the present disclosure, in which the electric parking drive acts on the two rear vehicle wheels in an illustrative but non-limiting manner. In the context of the present disclosure, the motor vehicle includes but is not limited to a combustion engine vehicle, an electric vehicle, a hybrid electric vehicle or the like.

As shown, the motor vehicle includes an electronic control unit (ECU) 100 configured for receiving or transmitting signals from or to relevant components; and a brake pedal 200. For instance, the brake pedal 200 can be disposed in a passenger compartment of the motor vehicle such that it can be pressed by a driver seating in the passenger compartment as needed. The motor vehicle includes four vehicle wheels, i.e., a front left vehicle wheel FL, a front right vehicle wheel FR, a rear left vehicle wheel RL, and a rear right vehicle wheel RR. Each of the front left vehicle wheel FL, the front right vehicle wheel FR, the rear left vehicle wheel RL, and the rear right vehicle wheel RR is equipped with a brake device. For instance, the brake device of the front left vehicle wheel FL includes a brake disc 500FL configured to rotate with the front left vehicle wheel FL and two braking frictional pads 610FL and 620FL which are installed non-rotatably relative to the brake disc 500L at opposing sides of the brake disc 500L respectively. The two braking frictional pads 610FL and 620FL can be installed on a brake caliper which at least partially surrounds the brake disc 500FL radically. When the motor vehicle is not braking, the braking frictional pads 610FL and 620FL are each spaced from the brake disc 500L. The braking frictional pad 620FL is located on the side of the brake disc 500FL facing the front the left vehicle wheel FL, and the braking frictional pad 610FL is located on the opposite side of the brake disc 500FL. To brake the motor vehicle, the braking frictional pads 610FL and 620FL can be driven to move towards the brake disc 500FL respectively and clamp the brake disc such that they are in contact with the brake disc 500FL rotating with the front left vehicle wheel FL. The contact generates a frictional force and increases resistance to the vehicle wheel of the motor vehicle, which facilitates to stop the motor vehicle. Similar to the brake device of the front left vehicle wheel FL, each of the front right vehicle wheel FR, the rear left vehicle wheel RL, and the rear right vehicle wheel RR is also equipped with a brake device. The respective brake device of the respective vehicle wheel includes a brake disc such as 500FR, 500RL, or 500 RR configured to rotate with the respective vehicle wheel and two braking frictional pads such as 610FR and 620FR, 610RL and 620RL, or 610RR and 620RR which are installed non-rotatably relative to the respective brake disc at opposing sides of the respective brake disc respectively.

A hydraulic brake drive of the vehicle brake system includes a main brake pump 300. This main brake pump 300 is operatively connected to the brake pedal 200. In the meanwhile, the main brake pump 300 is connected via hydraulic pipelines to brake wheel cylinders 310FL, 310FR, 310RL, and 310RR equipped for the vehicle wheels FL, FR, RL, and RR respectively. Furthermore, a brake fluid reservoir 400 is also in communication with the pump and/or the wheel cylinders via hydraulic pipelines. Each wheel cylinder can include a cylinder body and a brake piston such that the brake piston is hydraulically movable in the cylinder body in a linear manner. Each of the brake wheel cylinders 310FL, 310FR, 310RL, and 310RR is installed at a respective brake caliper so as to drive the paired braking frictional pads to move towards the respective brake disc respectively. In this way, when the brake pedal 200 is pressed, the main brake pump 300 drives a brake fluid via the hydraulic pipelines to operate the brake wheel cylinders 310FL, 310FR, 310RL, and 310RR such that the respective braking frictional pads can be in contact with the respective brake discs and thus the motor vehicle can be stopped or slowed down. Under control of the electronic control unit 100, the brake wheel cylinders of the front vehicle wheels FL, FR or the rear vehicle wheels RL, RR can be operated independently of each other.

Further as shown in FIG. 1, the rear left vehicle wheel RL is equipped with an electric parking brake 700RL, and the rear right vehicle wheel RR is equipped with an electric parking brake 700RR. Each of the electric parking brakes 700RL and 700RR is electrically connected to and controllable by the electronic control unit 100. Moreover, each of the electric parking brakes 700RL and 700RR is installed at the respective brake caliper to act on the respective braking frictional pads. The electric parking brakes 700RL and 700RR can be operated independently of the respective brake wheel cylinders 310RL and 310RR such that after the motor vehicle has been stopped, the braking frictional pads of the rear left vehicle wheel RL and/or the rear right vehicle wheel RR can be driven by the corresponding brake wheel cylinder to move towards and contact the respective brake disc. In this way, parking braking of the motor vehicle is realized by a frictional force generated between the braking frictional pads and the brake disc(s).

Figure 2A:
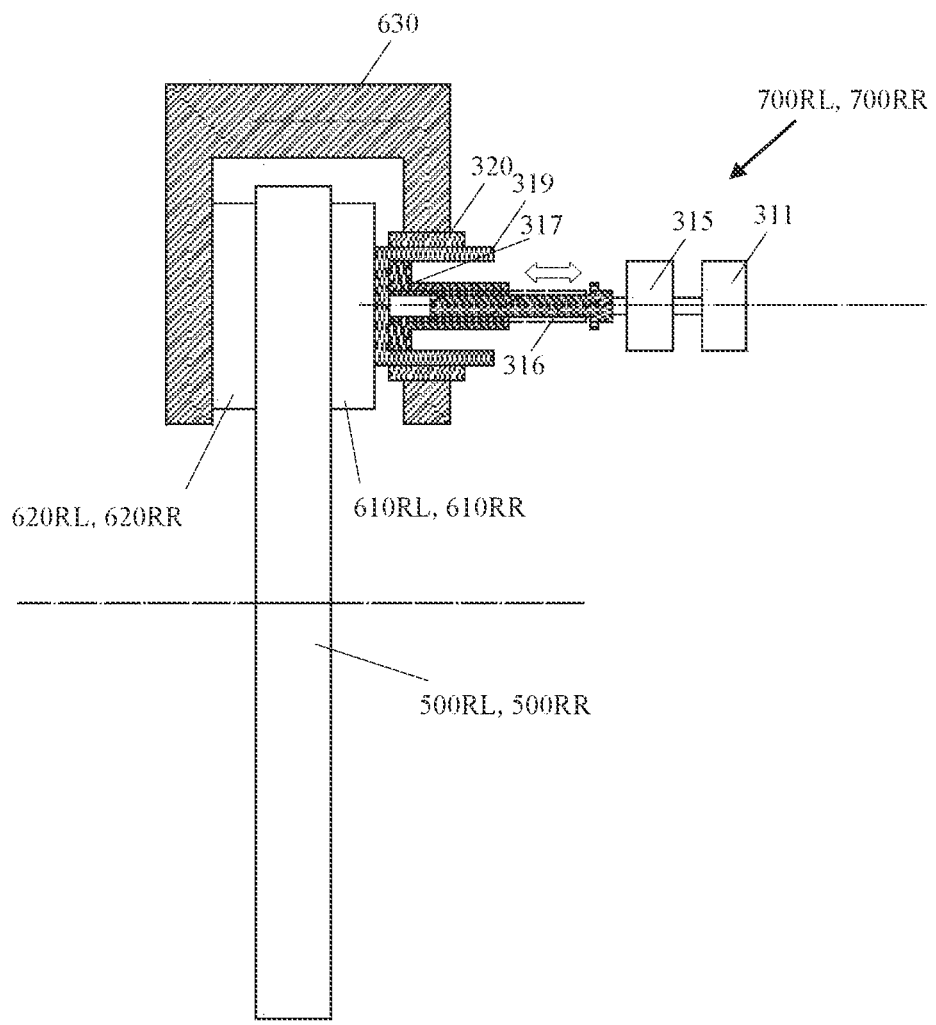
FIG. 2A is a schematic diagram illustrating an electric parking brake (EPB) according to one embodiment of the present disclosure, wherein the electric parking brake is installed to a brake caliper of the motor vehicle, and a drive element of the electric parking brake for driving a brake piston is in a position where it is in contact with the brake piston, such as a stop position where the braking frictional pad is driven by the brake piston to contact a brake disc to implement parking braking.

For example, FIG. 2A shows one electric parking brake that can be the electric parking brake 700RL or 700RR of FIG. 1. It should be understood that the drawings attached here are given for the purpose of explaining the principle of the present disclosure only, but do not limit the design or implementation of any specific component therein.

The electric parking brake is installed relative to a brake caliper 630. The brake caliper 630 can be installed such that it at least partially surrounds the brake disc 500RL or 500RR. The brake caliper 630 is installed securely to the motor vehicle's body or its suspension. The electric parking brake includes a drive motor 311 installed fixedly to the brake caliper 630. The electric parking brake further includes a core shaft 316 installed rotatably relative to the brake caliper 630. A threaded part 317 is sleeved about an outer surface of the core shaft 316 such that the threaded part is non-rotatable relative to the core shaft but is only axially movable back and forth along the core shaft. External threads are formed on the outer surface of the core shaft 316, and internal threads are formed on an inner surface of a central hole of the threaded part 317 such that the external threads are able to engage with the internal threads. Furthermore, the threaded part 317 is located within a hollow chamber of a brake piston 319 or is movable independently of the brake piston 319. In the meanwhile, the brake piston 319 is guided in a cylinder body 320 in such a way that the brake piston 319 is movable linearly therein. The cylinder body 320 is fixed relative to the brake caliper 630. It should be understood by a person skilled in the art that the brake piston 319 and the cylinder body 320 mentioned here can function as the brake piston and the cylinder body of the brake wheel cylinders described above. In fact, a piston driving force generated by the electric parking brake and a piston driving force generated by the main brake pump 300 via the respective brake wheel cylinder can be applied onto the brake piston 319 independently of each other. When desired, interaction between the electric parking brake and the brake piston 319 can be uncoupled. In the context of the present disclosure, the term "uncouple" means that two elements or devices do not generate a driving force applied therebetween.

The threaded part 317 can be guided linearly without rotating its outer surface. In other words, the threaded part 317 can be guided linearly within the hollow chamber of the brake piston 319 such that the threaded part or its outer surface is non-rotatable. Therefore, the threaded part 317 and the core shaft 316 constitute a thread-screw mechanism or they form a thread-screw mechanism therebetween, such that the threaded part 317, which does not rotate with the core shaft 316, is movable axially back and forth along the axis of the core shaft 316 due to the threaded engagement between the threaded part and the core shaft. Therefore, for example when parking braking is carried out, the threaded part 317 contacts the brake piston 319 by the linear movement of the threaded part 317 and further drive the brake piston 319 to push a respective braking frictional pad. In this way, the braking frictional pads arranged opposite to each other can be driven by the brake caliper 630 to contact a respective brake disc and the braking frictional pads can be pressed to generate on the brake disc a frictional force for parking braking. In this case, the brake piston 319 is in a parking braking position.

Because of the structural characteristics of the thread-screw mechanism, when the core shaft 316 is rotated reversely, the threaded part 317, which has contacted the brake piston 319 in the parking braking position, can be linearly moved reversely such that no force will be applied by the threaded part 317 onto the brake piston 319. That is to say, the electric parking brake is uncoupled from the brake piston 319. A travel distance of the threaded part 317 reversely moving during the uncoupling can depend on the time during which the core shaft 316 is reversely rotated or a mechanical stopper feature of the thread-screw mechanism itself. Usually, in order to release parking braking, it is only required to reversely rotate the core shaft to an extent in which the threaded part 317 is no longer in contact with the brake piston 319 so as to ensure that the frictional force for parking braking is no longer applied by the braking frictional pads onto the brake disc. In this way, during the subsequent vehicle driving, the hydraulic brake drive can quickly drive the brake piston, responsive to braking needs, such that the braking frictional pads can be enabled to contact the brake disc again to apply thereon a frictional force for driving braking. In an example of the present disclosure, the thread-screw mechanism is a type of linear movement mechanism that can be driven by a reducer mechanism as described below to drive the threaded part 317 to move linearly. It should be understood by a person skilled in the art that any other suitable means for converting a rotating movement into a linear movement can be adopted as the linear movement mechanism in the technical solutions of the present disclosure.

As shown in FIG. 2, the electric parking brake includes a reducer mechanism 315 installed relative to the brake caliper 630. The reducer mechanism 315 has an input end connected to an output shaft of the drive motor 311, and an output end connected to the core shaft 316 such that when the output shaft of the drive motor 311 rotates forwards or backwards, the core shaft 316 can be driven by the reducer mechanism 315 to rotate forwards or backwards correspondingly. As an example, the reducer mechanism can be a two-stage worm and screw mechanism installed on the brake caliper 630. The two-stage worm and screw mechanism includes a first-stage reducer including a first-stage screw and a first-stage worm in engagement with each other, and a second-stage reducer formed by a second-stage screw and a second-stage worm in engagement with each other. The first-stage screw is connected to the output shaft of the drive motor 311 and the second-stage worm is connected to the core shaft 316. Both the first-stage worm and the second-stage screw are disposed on a single rotatable shaft. The reducer mechanism is configured to provide a lock function during parking braking, such that a counterforce caused by the braking frictional pads to the brake piston 317 will not be transmitted via the threaded part 317, the core shaft 316 and the reducer mechanism to the output shaft of the drive motor 311, causing the output shaft to rotate. It should be understood by a person skilled in the art that any other form of reducer mechanism for providing a similar lock function for parking braking such as a single-stage worm and screw mechanism or a gear reducer mechanism can be used in the technical solutions of the present disclosure.

The threaded part 317 can be called as a piston driving part 317 of the electric parking brake. Therefore, during parking braking, if a pitch of thread of the thread-screw mechanism, a reduction ratio of the reducer mechanism, a run time of the output shaft of the drive motor 311 are known, a travel distance of the piston driving part 317 moving from a position where it is out of contact with the brake piston 319 to a position where it pushes the brake piston 319 (i.e., being associated with the parking braking position of the brake piston 319) can be calculated.

Figure 3:
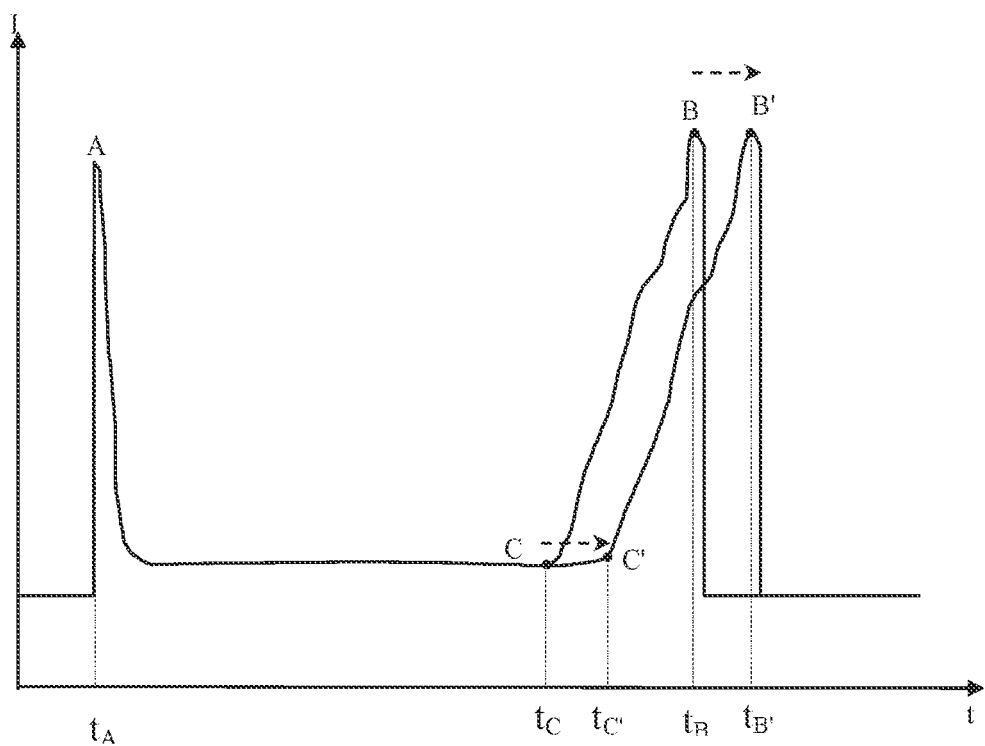
FIG. 3 is a schematic diagram illustrating a curve graph of the current changed over time of a drive motor of the electric parking brake in operation.

FIG. 3 is a schematic diagram illustrating the changes over time of the current of the drive motor 311 of the electric parking brake in operation. When the electric parking brake is working, an operating current of the drive motor 311 can be measured by a specific detection circuit and the measured values can be transmitted into the electronic control unit 100. When parking braking is required, the drive motor 311 is activated to start. Because of the characteristics of the motor, a greater starting current will usually occur, which is shown as a current peak A in FIG. 3. After the current peak A, the operating current drops quickly. Then the piston driving part 317 is driven by the drive motor 311 through the reducer mechanism and the thread-screw mechanism to enable the piston driving part 317 to undergo a free stroke (during which the piston driving part 317 is not in contact with the brake piston 319 yet), the operating current of the drive motor 311 appears stable, i.e., in a section from about $t_A$ to $t_C$. Then, at time $t_C$, the piston driving part 317 begins to contact the brake piston 319 and presses the brake piston 319 to drive a respective braking frictional pad to move towards and contact the brake disc. During this period, as the piston driving part 317 will be correspondingly counteracted and thus blocked by the brake piston 319, the operating current of the drive motor 311 rises quickly as shown in FIG. 3. Finally, when the brake piston 319 arrives at its parking braking position, a cut-off current peak B (at time $t_B$) will be set to prevent the drive motor from being damaged by an excessive operating current. When the operating current is equal to the cut-off current peak B, the drive motor 311 will be deactivated to stop working. Therefore, at time $t_B$, because of the lock function of the reducer mechanism as mentioned above, the brake piston 319 is held in the parking braking position via the piston driving part 317 and the reducing mechanism such that parking braking is achieved by the electric parking brake. When vehicle driving is needed, the drive motor 311 is started again such that its output shaft is rotated reversely such that the piston driving part 317 can be linearly moved reversely to an extent in which the brake piston 319 is released from its parking braking position, and a frictional force for parking braking will no longer be generated by the electric parking brake between the respective braking frictional pads and the brake disc. That is to say, the electric parking brake is uncoupled from the brake piston 319.

Figure 2B:
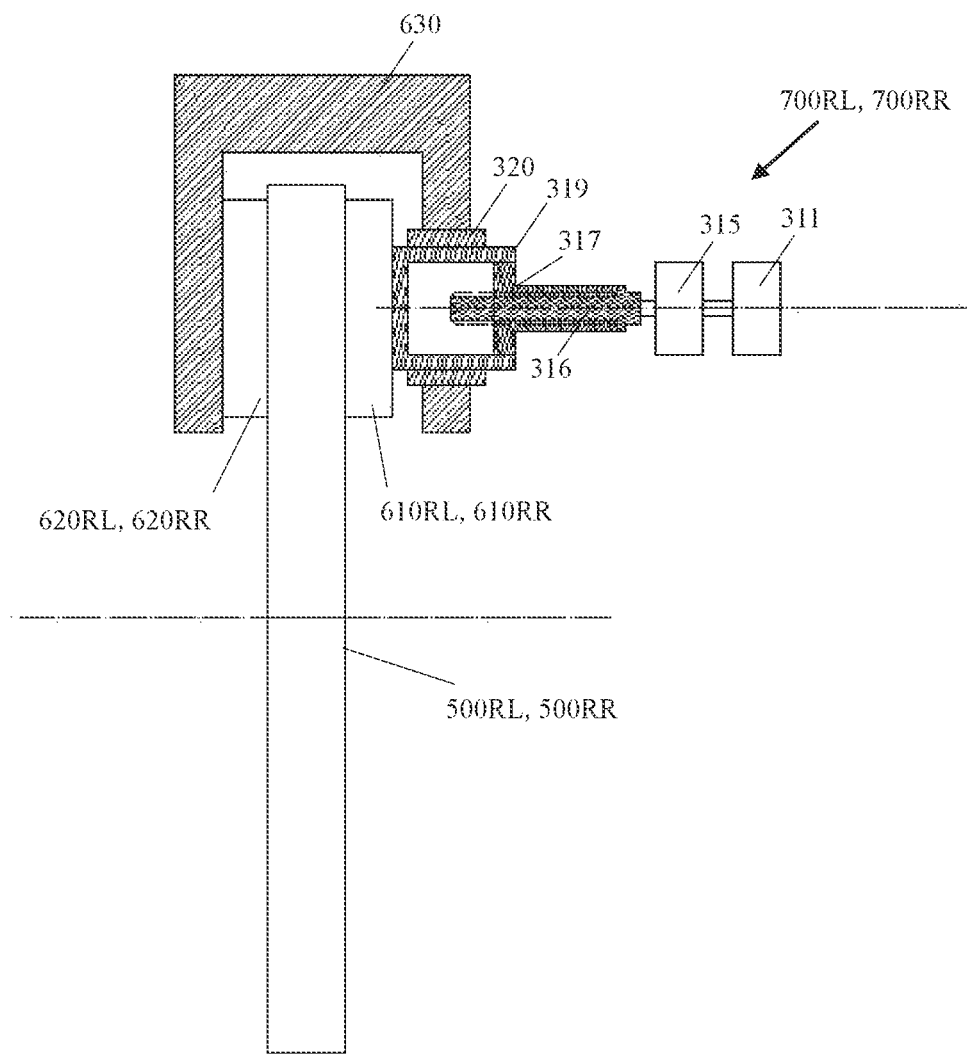
FIG. 2B is a schematic diagram illustrating the electric parking brake of FIG. 2A, wherein the drive element of the electric parking brake is in a start position, i.e., a reference position, of the drive element's free stroke before it contacts the brake piston.

Therefore, it can be seen that when a motor vehicle of the prior art is braking for parking, an initial position of its piston driving part (like 317) for parking braking is always random due to continuous wear of braking frictional pads. Therefore, in order to unify the random initial positions and to determine a travel distance of the piston driving part 317 moving linearly during parking braking, an initial position can be intentionally set for the piston driving part 317. Generally, in the design of the thread-screw mechanism between the piston driving part 317 and the core shaft 316, a stopper feature such as a stopper block can be provided at an axial location of the core shaft 316 so as to define the maximum extent to which the piston driving part 317 can move in a direction away from the brake piston 319, as shown in FIG. 2B. For an assembled electric parking brake, the maximum movable range of the piston driving part 317 is always fixed and thus can be regarded as a reference position of the piston driving part 317. That is to say, whenever braking parking is required, the piston driving part 317 is set to first move to the reference position and then the time taken by the piston driving part 317 to move from that reference position to a position, where it drives the brake piston 319 to arrive at the parking braking position, is measured. Using the measured time period, a distance of the brake driving part 317 moving from the reference position to a stop position (being associated with the parking braking position) can be calculated.

It should be understood by a person skilled in the art that the time $t_A$ of the current peak, the time $t_C$ of stable conversion, and the time $t_B$ of the cut-off current peak can be detected by a suitable electronic circuit, and transmitted to and recorded in the electronic control unit 100. Therefore, using a program preset in the electronic control unit 100, the changes of the current over time are recorded during each parking braking. Then, by measuring or determining the travelling time period of the piston driving part 317, a travel distance L of a braking frictional pad from an initial position to a position where parking braking is achieved can be determined by an equation (1):

$$L=f1(\Delta t_E, \eta, p) \qquad (1)$$

wherein L is a travel distance of a single braking frictional pad, $\Delta t_E$ is a time period during which the piston driving part 317 of the electric parking brake moves from its initial position to its stop position (being associated with the parking braking position of the brake piston 319), $\eta$ is a transmission ratio of the reducer mechanism, p is a pitch of thread of the thread-screw mechanism, and f1 is a function associated with $\Delta t_E$, $\eta$, and p. It should be understood by a person skilled in the art that although $\Delta t_E$ can be equal to $|t_A-t_B|$ in an example as further described below, this example is illustrative and not in any way limiting. In another example, $\Delta t_E$ can be equal to $|t_A"t_C|$. That is to say, it is ok to intentionally set a transition current point C or a cut-off peak point B to correspond to the parking braking position where the brake piston 319 locates.

By way of an example, $f1=(n_M/\eta)\cdot p \cdot \Delta t_E/2$, wherein $n_M$ is a rate of rotation of the output shaft of the drive motor 311. As another example, a correction factor related to other aspects such as a thickness loss of the brake disc or the like could be also added in the function of f1. For instance, a correction factor related to the thickness loss of the brake disc can be determined in advance through experiments. In this way, the function can be altered as $f1=(n_M/\eta)\cdot p\cdot \Delta t_E/2+\eta$, wherein $\theta$ is the correction factor related to the thickness loss of the brake disc.

Figure 4A:
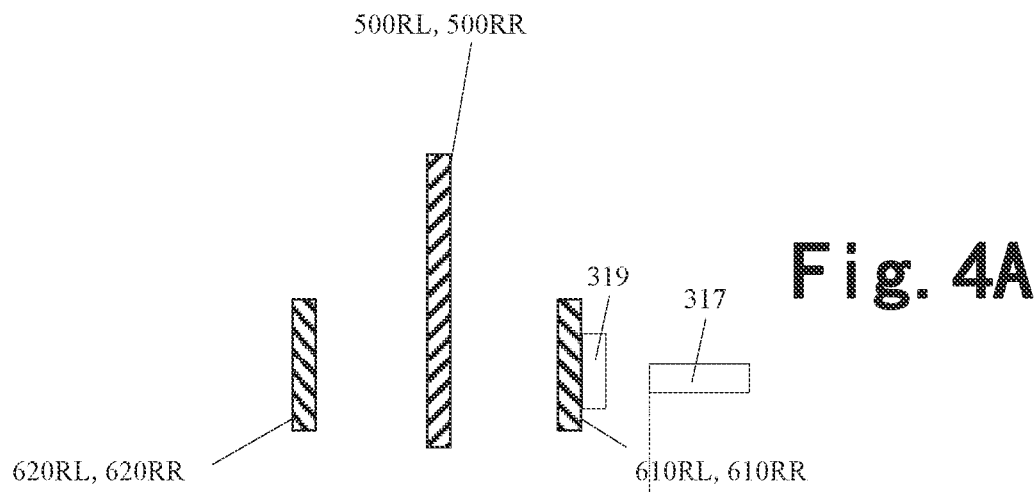
FIG. 4A is a schematic diagram illustrating a brake disc and two braking frictional pads which act on opposing sides of the brake disc respectively, wherein the motor vehicle is not in a parking braking state.
Figure 4B:
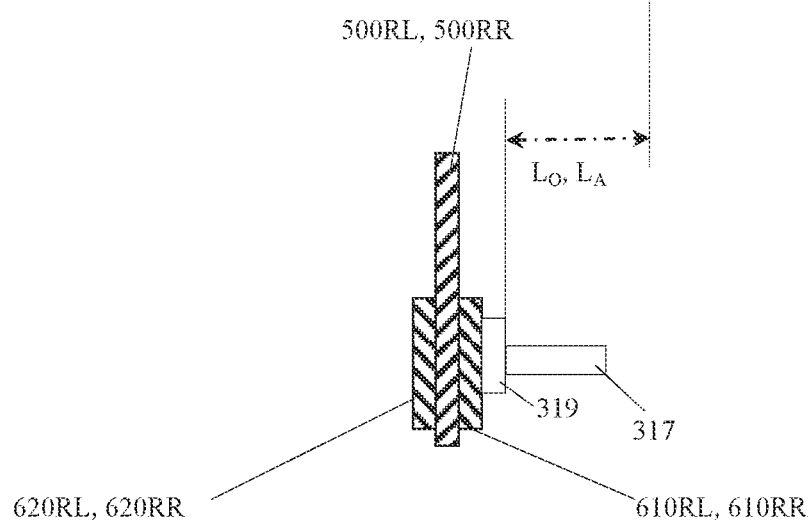
FIG. 4B is a schematic diagram illustrating the brake disc and the two braking frictional pads of FIG. 4A, wherein the motor vehicle is in the parking braking state.

Assume that the transition current point C and the cut-off peak point B represent the currents of a drive motor 311 with regard to new braking frictional pads, and a transition current point C' and the cut-off peak point B' represent the currents of the drive motor 311 with regard to the same braking frictional pads after they have been used for a certain period. As shown in FIGS. 4A and 4B (for clarity, the gaps between the sheets and a brake disc are enlarged for illustration), after the new braking frictional pads are installed in place, the electric parking brake is activated to record the travel time period, $\Delta t_E=|t_A-t_B|$, during which the piston driving part 317 moves from its initial position to its stop position for parking braking, and a travel distance (i.e., a reference distance) $L_0$ of the piston driving part 317 can be determined according to the above equation (1). Then, after the braking frictional pads are worn due to usage, parking braking is carried out again. If it is desired now to determine the current thickness of the braking frictional pad, the electric parking brake is first activated during the parking braking to drive the piston driving part 317 to its reference position, and then the drive motor 311 of the electric parking brake is reversely activated such that the piston driving part 317 is moved from the reference position to its stop position by a distance $L_A$, which corresponds to a time period $\Delta t_E = |t_A - t_B|$. Because the above calculation process can be carried out whenever parking braking is achieved, the time $t_A$ of a starting current corresponding to the starting current peak A is always unchanged under the premise that the performance of the drive motor 311 is unchanged. Therefore, it is proper to compare $L_O$ of the initial calculation with $L_A$ of each subsequent calculation that has the same time point for the starting current. That is to say, $\Delta L_R = |L_O - L_A|$ can be regarded as the thickness loss of the braking frictional pad. In an embodiment of the present disclosure, a travel distance of the piston driving part 317 first determined with regard to a new braking frictional pad or an average of travel distances of the piston driving part 317 calculated for several times during its initial usage period can be considered as the reference distance $L_O$ of the piston driving part 317.

The method for determining the thickness loss of the braking frictional pad according to the present disclosure as explained above is advantageous for the following reasons. Although a time period $|t_B - t_C|$ for parking braking using new braking frictional pads is less than a time period $|t_{B'} - t_{C'}|$ for parking braking with regard to the braking frictional pads after a period of usage, the difference between them is very tiny. If such a tiny time difference were used to make the calculation, greater calculation errors would be introduced, and it would be required to determine the point C with very high precision. However, according to the present disclosure, whenever parking braking is carried out, the piston driving part 317 is first returned to its reference position. This results in a uniform standard way to calculate the time difference between the time $t_A$ of the starting current of the drive motor 311 and the time $t_B$ or $t_{B'}$ of the cut-off current peak and to determine a travel distance of the piston driving part 317 based on such time difference. As the difference between the time $t_A$ of the starting current and the time $t_B$ or $t_{B'}$ of the cut-off current peak is significantly greater than the difference between the transition current time $t_C$ or $t_{C'}$ and the time $t_B$ or $t_{B'}$ of the cut-off current peak, calculation errors can be reduced and thus the ultimate calculation accuracy can be increased.

Therefore, with respect to a motor vehicle equipped with an electric parking brake, the present disclosure proposes a novel method or process for continuously monitoring the thickness loss (or wear) of a braking frictional pad cooperating with the electric parking brake.

Figure 5:
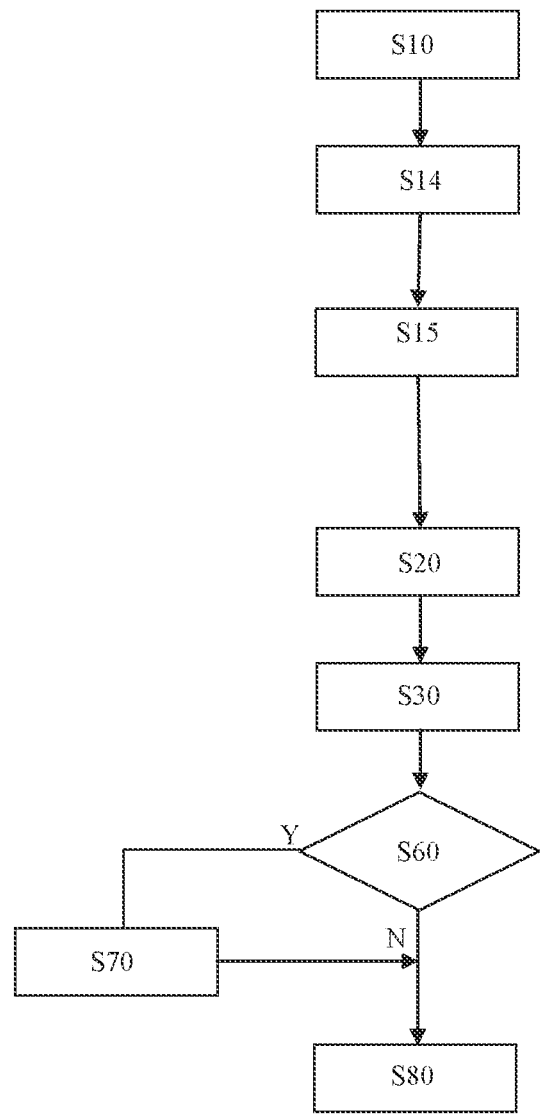
FIG. 5 is a flow chart illustrating a method according to an embodiment of the present disclosure for monitoring wear of a braking frictional pad.

FIG. 5 is a flow chart illustrating an example of the method or process for monitoring the wear of the braking frictional pad. It should be understood by a person skilled in the art that any method and process or their steps explained herein can be coded as programs that can be stored in a memory of the electronic control unit 100, and retrieved and executed as required. In step S10, it is determined whether or not the motor vehicle has stopped stably. For instance, whether the vehicle has stopped stably is determined based on a collection of information from various existing sensors of the motor vehicle. If the determination result in step 510 is "Yes", the method or process goes to step S14; otherwise, the method or process ends. In step S14, for safety reasons during parking braking, a wheel cylinder of a vehicle wheel that is not equipped with the electric parking brake is first activated such that it will ensure that the vehicle wheel that is not equipped with the electric parking brake is always in braking. Then, in step S15, the electric parking brake is activated such that its drive motor 311 can drive the piston driving part 317 to operate in such a way that the piston driving part 317 goes to its reference position, and stays in the reference position. Taking the electric parking brakes 700RL and 700RR of FIG. 1 as an example of the electric parking brake as mentioned in the method or process, in step S20, the electric parking brake 700RL and/or 700RR of FIG. 1 is operated in such a way that the respective brake piston will drive the respective braking frictional pad to contact the respective brake disc to accomplish parking braking. Then, a travel distance of each braking frictional pad of the rear wheel RL or RR equipped with the electric parking brake 700RL or 700RR during monitoring of the wear of the braking frictional pad through parking braking can be calculated using the equation (1) and based on a run time $\Delta t$ of the drive motor 311, a transmission ratio $\eta$ of the relevant reducer mechanism, a pitch of thread of the relevant thread-screw mechanism. For instance, $\Delta t$ of the drive motor 311 can be $\Delta t_E$ for determining $L_O$ or $L_A$ as shown in FIGS. 4A and 4B.

Next, in step S30, it will be determined whether it is the first calculation for parking braking or not. If the determination result is "Yes", then it means that the calculation result of step S20 can be referred to as $L_O$. Therefore, the calculation result will then be recorded as the reference distance $L_O$ for later use. Alternatively, this step can be carried out when a new motor vehicle just leaves a production line of a vehicle plant or when tire replacement for a motor vehicle is carried out in maintenance. If the determination result is "No", then it means that the calculating result of step S20 can be regarded as $L_A$ and thus a thickness loss of the current braking frictional pad can be determined by the absolute value of difference between the travel distance $L_A$ from the present calculation for monitoring the wear of the braking frictional pad and the reference distance $L_O$ from the first calculation.

Next, in step S60, if the determined thickness loss of the current braking frictional pad is greater than or equal to a given value, the method or process goes to step S70. For instance, in step S70, an indicator in a passenger compartment can be activated so as to visually and/or audibly alert a driver sitting in the passenger compartment; and/or some functions of the motor vehicle can be limited, for example the motor vehicle will be configured to run only at a restricted velocity such as a maximum speed of 50 kilometers per hour, so as to alert the driver. If the determined thickness loss of the current braking frictional pad is less than the given value, the method or process goes to step S80 and calculation data can be sent to a dashboard or the driver's mobile device to be displayed as status information. In step S80, the electric parking brake can continue to work so as to ensure that the motor vehicle parks safely or the wheel cylinder of the vehicle wheel that is not equipped with the electric parking brake can be selectively deactivated.

In the above embodiment, although the basic ideas of the present disclosure are explained with respect to the electric parking brakes 700RL and 700RR of the rear vehicle wheels RL and RR, it should be understood by a person skilled in the art that these basic ideas are also applicable to a motor vehicle which is equipped with an electric parking brake only for its front vehicle wheel FL and/or FR.

In an alternative embodiment, the principles of the present disclosure are applicable to a motor vehicle equipped with an electric mechanical brake (EMB). In the context of the present disclosure, the electric mechanical brake comprises a device that can drive a brake piston to generate a frictional braking force between a braking frictional pad and a brake disc in both driving braking and parking braking. The electric mechanical brake can be applied to each of the four vehicle wheels of a motor vehicle. Moreover, the motor vehicle equipped with the electric mechanical brake can be also provided with a hydraulic brake drive as a braking safety auxiliary device, or without the hydraulic brake drive such that driving braking and parking braking can be accomplished by the electric mechanical brake only. It should be understood by a person skilled in the art that the electric mechanical brake further includes a drive motor, a reducer mechanism operatively connected to the drive motor and having a lock function in braking, and a piston driving part operatively connected to the reducer mechanism and configured to act on a brake piston to drive relevant braking frictional pads to move.

Therefore, the aforementioned method or process is also applicable to a motor vehicle equipped with electric mechanical brakes. For instance, for a motor vehicle equipped with electric mechanical brakes only, step S10 of FIG. 5 can be modified such that braking of front vehicle wheels is first accomplished by the associated electric mechanical brakes. In the subsequent steps, the wear of the braking frictional pads can be determined only with respect to rear vehicle wheels via the electric mechanical brakes thereof; and then parking braking is accomplished by the electric mechanical brakes of the rear vehicle wheels only; and in the meanwhile, the wear of the braking frictional pads can be determined with respect to the front vehicle wheels via the electric mechanical brakes thereof.

As discussed above, the present disclosure provides a method or process for monitoring wear of a braking frictional pad of a motor vehicle, wherein the motor vehicle includes a brake device acting on each vehicle wheel of two front vehicle wheels or two rear vehicle wheels. The brake device has a brake disc configured to rotate with the corresponding vehicle wheel, a braking frictional pad configured to be non-rotatable relative to the vehicle wheel and linearly movable parallel to a rotational axis of the vehicle wheel, a cylinder body installed to the motor vehicle's body, and a brake piston linearly movable in the cylinder body. The motor vehicle further includes an electric parking brake or an electric mechanical brake equipped for each vehicle wheel of the two front vehicle wheels or the two rear vehicle wheels. The electric parking brake or the electric mechanical brake includes a drive motor, a reducer mechanism connected to an output shaft of the drive motor, a linear movement mechanism driven by the reducer mechanism, and a piston driving part driven by the linear movement mechanism to move linearly. The reducer mechanism is configured to provide, when braking, a lock function by which the piston driving part is prevented from moving freely. The brake piston is configured to be driven by the piston driving part to contact and move the braking frictional pad.

The method or process includes:
after the motor vehicle has been parked, operating the drive motor to drive the piston driving part to a preset reference position;
continuing to operate the drive motor to drive the piston driving part from the reference position to a stop position where it contacts the brake piston, wherein the stop position corresponds to a parking braking position of the brake piston;
determining a distance between the reference position and the stop position; and comparing the determined distance with a preset reference distance to determine the wear of the monitored braking frictional pad.

Furthermore, the present disclosure provides a system for monitoring wear of a braking frictional pad of a motor vehicle, wherein the motor vehicle includes a brake device acting on each vehicle wheel. The brake device has a brake disc configured to rotate with the corresponding vehicle wheel, a braking frictional pad configured to be non-rotatable relative to the vehicle wheel and linearly movable parallel to a rotational axis of the vehicle wheel, a cylinder body secured relative to the motor vehicle's body, and a brake piston linearly movable in the cylinder body. The motor vehicle further includes a brake device equipped for each vehicle wheel of two front vehicle wheels or two rear vehicle wheels. The brake device has a brake disc rotatable with the corresponding vehicle wheel and a braking frictional pad non-rotatable relative to the relevant vehicle wheel and linearly movable parallel to a rotational axis of the corresponding vehicle wheel.

Figure 6:
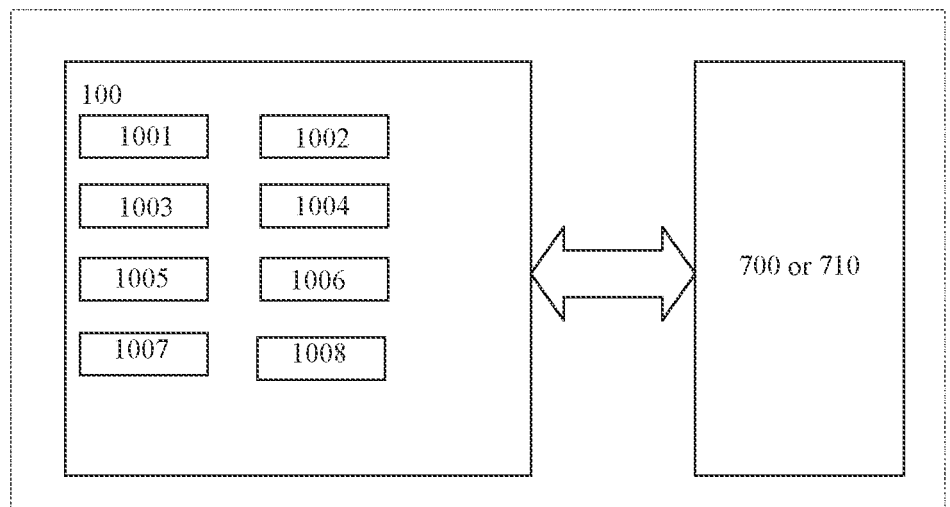
FIG. 6 is a block diagram illustrating a system according to an embodiment of the present disclosure for monitoring wear of a braking frictional pad.

Furthermore as shown in FIG. 6, the system includes: an electric parking brake 700 or an electric mechanical brake 710 equipped for each vehicle wheel of the two front vehicle wheels or the two rear vehicle wheels, wherein the electric parking brake or the electric mechanical brake includes a drive motor, a reducer mechanism connected to an output shaft of the drive motor, a linear movement mechanism driven by the reducer mechanism, and a piston driving part driven by the linear movement mechanism to move linearly; the reducer mechanism is configured to provide, when braking, a lock function by which the piston driving part is prevented from moving freely; the brake piston is configured to be driven by the piston driving part to contact and move the braking frictional pad; and an electronic control unit 100 which is electrically connected to the electric parking brake 700 or the electric mechanical brake 710, to control operation of the electric parking brake 700 or the electric mechanical brake 710.

The electronic control unit 100 includes a first module 1001 configured to provide, after the motor vehicle has been parked, instructions for operating the drive motor such that the piston driving part is moved to a preset reference position; a second module 1002 configured to provide instructions for continuing to operate the drive motor to drive the piston driving part from the reference position to a stop position where it contacts the brake piston, wherein the stop position corresponds to a parking braking position of the brake piston; a third module 1003 configured to provide instructions for determining a distance between the reference position and the stop position; and a fourth module 1004 configured to provide instructions for comparing the determined distance with a preset reference distance to determine the wear of the monitored braking frictional pad.

The reference distance is a travel distance of the piston driving part moving from the reference position to the stop position when the thickness of the monitored braking friction pad is known or when the monitored braking friction pad is a brand new braking frictional pad. In the above embodiments, the reference distance is determined when the braking frictional pad is a brand new one. However, it should be understood by a person skilled in the art that the determination of the reference distance can be based on the known thickness of the monitored braking frictional pad. That is to say, if the thickness of the monitored braking frictional pad is known, the reference distance can be determined in advance. Understandably, when the braking frictional pad is a brand new one, its thickness is certainly known. If the monitored braking frictional pad is a used one, it is required to measure and record the thickness of the monitored braking frictional pad and then correspondingly determine the reference distance in advance to apply the method or process or the system according to the present disclosure.

A thickness loss of the monitored braking frictional pad is the absolute value of the difference between the determined distance and the reference distance.

In one embodiment, each vehicle wheel of the motor vehicle is equipped with the electric mechanical brake only.

The electronic control unit 100 further includes a fifth module 1005 configured to provide instructions for alerting a driver of the motor vehicle to replace the monitored braking frictional pad with a new one when the thickness loss of the monitored braking frictional pad is greater than a preset threshold. For instance, the electronic control unit 100 can be connected to a buzzer alarm which will beep after it receives the instructions from the fifth module 1005. For a motor vehicle equipped with electric parking brakes at its front or rear vehicle wheels only, this preset value can be determined by an automobile manufacturer based on the collective historical data of replacing braking frictional pads by vehicle users.

The linear movement mechanism is a thread-screw mechanism including a core shaft connected to an output shaft of the reducer mechanism. The core shaft is formed with external threads on its outer surface. The piston driving part is a threaded part having internal threads which are configured to engage the external threads. Moreover, when the core shaft rotates, the threaded part is configured to be non-rotatable and is driven to axially move back and forth along the core shaft.

The distance between the reference position and the stop position is at least dependent on a rotation speed of an output shaft of the drive motor, a transmission ratio of the reducer mechanism, a pitch of thread of the thread-screw mechanism, and a duration of the drive motor being turned on.

If the motor vehicle is equipped with the electric parking brake only on the front or rear wheels, the motor vehicle further includes a hydraulic brake drive configured to accomplish parking braking of a vehicle wheel that is not equipped with the electric parking brake, before the thickness loss is determined. The electronic control unit includes a seventh module 1007 configured to control the hydraulic brake drive.

The electronic control unit 100 further includes a sixth module 1006 configured to provide instructions for determining the current thickness of the monitored braking frictional pad on the basis of its thickness loss and/or displaying the current thickness of the monitored braking frictional pad on a dashboard of the motor vehicle or transmitting it to a mobile device of the driver. For example, the instructions can be provided to a special displaying meter of the dashboard of the motor vehicle via an existing bus of the motor vehicle, or can be sent to the driver's mobile device such as a mobile phone or a notebook computer via wireless communication, such as WiFi, a mobile network or the like.

The current thickness of the monitored braking frictional pad is the thickness of a new braking frictional pad of the same specification as the monitored braking frictional pad minus the thickness loss of the monitored braking frictional pad.

A direction along which the piston driving part moves to the reference position is opposite to a direction along which the piston driving part moves from the reference position to the stop position.

For the motor vehicle that is equipped with the electric mechanical brakes for the front and rear vehicle wheels, the electronic control unit 100 further include an eighth module 1008 which is configured to provide instructions for: 1) first accomplishing parking braking of the front vehicle wheels by their electric mechanical brakes, and then determining the thickness loss of the braking frictional pads of the rear vehicle wheels by their electric mechanical brakes; or 2) first accomplishing parking braking of the rear vehicle wheels by their electric mechanical brakes, and then determining the thickness loss of the braking frictional pads of the front vehicle wheels by their electric mechanical brakes.

Although some specific embodiments and/or examples of the present disclosure are described here, they are given for illustrative purposes only and cannot be deemed to restrict the scope of the present disclosure in any way. Furthermore, it should be understood by a person skilled in the art that the embodiments and/or examples described here can be combined. Without departing from the spirit and scope of the present disclosure, various replacements, modifications and alternations can be carried out.

What is claimed is:

1. A method for monitoring a thickness loss of a braking frictional pad of a motor vehicle, the motor vehicle comprising: vehicle wheels; a brake device acting on a vehicle wheel, the brake device including a braking frictional pad that is non-rotatable relative to the vehicle wheel and is linearly movable parallel to a rotational axis of the vehicle wheel; a brake piston configured to drive the braking frictional pad; and an electric parking brake or an electric mechanical brake, the electric parking brake or the electric mechanical brake having a drive motor and a piston driving part driven by the drive motor to be linearly movable, the piston driving part configured to drive the brake piston to contact the braking frictional pad and in turn drive the braking frictional pad to move when the motor vehicle is braking; the method comprising:

operating, after the motor vehicle has been parked, the drive motor to move the piston driving part to a preset reference position;

continuing to operate the drive motor to move the piston driving part from the reference position to a stop position where it contacts the brake piston, wherein the stop position is associated with a parking braking position of the brake piston;

determining a distance between the reference position and the stop position; and calculating a difference between the determined distance and a predetermined reference distance to determine the thickness loss of the monitored braking frictional pad;

wherein the reference distance is a travel distance of the piston driving part moving from the reference position to the stop position, said travel distance is determined when the monitored braking frictional pad has a known thickness or the monitored braking frictional pad is a brand new one, and when the motor vehicle is in parking braking.

2. The method according to claim 1, wherein the thickness loss of the monitored braking frictional pad is the absolute value of the difference between the determined distance and the reference distance.

3. The method according to claim 2, further comprising alerting a driver of the motor vehicle to replace the braking frictional pad with a new one when the thickness loss exceeds a threshold.

4. The method according to claim 3, wherein the electric parking brake or the electric mechanical brake further comprises a reducer mechanism connected to an output shaft of the drive motor, and a linear movement mechanism driven by the reducer mechanism; said reducer mechanism is configured to provide a lock function in braking to prevent the piston driving part from moving freely, and said linear movement mechanism is configured to drive the piston driving part to linearly move.

5. The method according to claim 4, wherein the linear movement mechanism is a thread-screw mechanism that includes a core shaft connected to the output shaft of the drive motor, said core shaft comprising external threads on its outer surface, and said piston driving part is a threaded part having internal threads that engage the external threads of the core shaft and is configured to be non-rotatable relative to the core shaft, and be axially movable back and forth along the core shaft.

6. The method according to claim 5, wherein the distance between the reference position and the stop position is at least dependent on a rotation speed of the output shaft of the drive motor, a transmission ratio of the reducer mechanism, a pitch of thread of the thread-screw mechanism, and a time duration during which the drive motor is turned on.

7. The method according to claim 6, wherein each vehicle wheel of the motor vehicle is equipped with the brake device and a hydraulic brake drive, each hydraulic brake drive comprising a cylinder body installed fixedly to the motor vehicle's body and a brake piston configured to be linearly movable in each cylinder body to drive each braking frictional pad of each brake device to move;
   wherein each brake piston of the respective hydraulic brake drive is the piston driving part driven by the electric parking brake or the electric mechanical brake.

8. The method according to claim 7, wherein before the thickness loss can be determined, a vehicle wheel that is not equipped with the electric parking brake is braked for parking via the hydraulic brake drive.

9. The method according to claim 7, wherein each monitored braking frictional pad's current thickness is determined as a function of the thickness loss.

10. The method according to claim 9, wherein each monitored braking frictional pad's current thickness can be displayed on a dashboard of the motor vehicle or transmitted to a mobile device of the driver.

11. The method according to claim 9, wherein the current thickness of each braking frictional pad is determined by deducting the thickness loss of each monitored braking frictional pad from a thickness of a new braking frictional pad of the same specification as each monitored braking frictional pad or a known thickness of each monitored braking frictional pad prior to performing the method.

12. The method according to claim 1, wherein the motor vehicle comprising front and rear vehicle wheels, and each vehicle wheel is equipped with the electrical mechanical brake, the method is performed to determine the thickness loss of the braking frictional pads of the rear vehicle wheels through the equipped electric mechanical brake after parking braking of the front vehicle wheels is accomplished through their electric mechanical brakes or to determine the thickness loss of the braking frictional pads of the front vehicle wheels through their equipped electric mechanical brakes after parking braking of the rear vehicle wheels is accomplished through the electric mechanical brakes.

13. The method according to claim 1, wherein a direction along which the piston driving part moves to the reference position is opposite to a direction along which the piston driving part moves from the reference position to the stop position.

14. A system for monitoring a thickness loss of a braking frictional pad of a motor vehicle, the motor vehicle comprising:
   vehicle wheels;
   a brake device acting on each of the vehicle wheels, the brake device including a braking frictional pad configured to be non-rotatable relative to the vehicle wheel and be linearly movable parallel to a rotational axis of the vehicle wheel; and
   a brake piston configured to drive the braking frictional pad;
   the system comprising:
   an electric parking brake or an electric mechanical brake, the electric parking brake or the electric mechanical brake having a drive motor and a piston driving part driven by the drive motor to be linearly movable, the piston driving part configured to drive the piston to contact the braking frictional pad and in turn drive the braking frictional pad to move when the motor vehicle is braking; and
   an electronic control unit electrically connected to the electric parking brake or the electric mechanical brake to control operation of the electric parking brake or the electric mechanical brake, comprising:
   a first module configured to, after the motor vehicle has been parked, provide instructions for operating the drive motor to move the piston driving part to a preset reference position;
   a second module configured to provide instructions for continuing to operate the drive motor to drive the piston driving part from the reference position to a stop position where it contacts the brake piston, wherein the stop position is associated with a parking braking position of the brake piston;
   a third module configured to provide instructions for determining a distance between the reference position and the stop position; and
   a fourth module configured to provide instructions for a difference between the determined distance and a predetermined reference distance to determine the thickness loss of the monitored braking frictional pad;
   wherein the reference distance is a travel distance of the piston driving part moving from the reference position to the stop position, said travel distance is determined when the monitored braking frictional pad has a known thickness or the monitored braking frictional pad is a brand new one, and when the motor vehicle is in parking braking.

15. The system according to claim 14, wherein the thickness loss of the monitored braking frictional pad is the absolute value of the difference between the determined distance and the reference distance.

16. The system according to claim 15, wherein the electronic control unit further comprises a fifth module configured to provide instructions for alerting a driver of the motor vehicle to replace the braking frictional pad with a new one when the thickness loss exceeds a threshold.

17. The system according to claim 16, wherein the electric parking brake or the electric mechanical brake further comprises a reducer mechanism connected to an output shaft of the drive motor, and a linear movement mechanism driven by the reducer mechanism; said reducer mechanism is configured to provide a lock function in braking to prevent the piston driving part from moving freely, and said linear movement mechanism is configured to drive the piston driving part to linearly move.

18. The system according to claim 16, wherein the linear movement mechanism is a thread-screw mechanism that includes a core shaft connected to the output shaft of the drive motor, said core shaft comprising external threads on its outer surface, and said piston driving part is a threaded part having internal threads that engage the external threads of the core shaft and is configured to be non-rotatable relative to the core shaft, and be axially movable back and forth along the core shaft.

* * * * *